United States Patent [19]

Holtey

[11] 3,857,019

[45] Dec. 24, 1974

[54] CARD READER DATA LOGIC WITH POSITION INDICATION AND ERROR DETECTION

[75] Inventor: Thomas O. Holtey, Newton Lower Falls, Mass.

[73] Assignee: Honeywell Information Systems Inc., Waltham, Mass.

[22] Filed: Mar. 5, 1973

[21] Appl. No.: 337,975

[52] U.S. Cl. ...... 235/61.11 A, 200/46, 235/61.11 R

[51] Int. Cl. .......................................... G06k 5/00

[58] Field of Search. 200/46; 235/61.11 R, 61.11 A, 235/61.11 D, 61.11 E

[56] References Cited

UNITED STATES PATENTS

| | | | |
|---|---|---|---|
| 2,858,073 | 10/1958 | Taube | 235/61.12 |
| 3,316,392 | 4/1967 | Bailey et al. | 235/61.12 |
| 3,465,130 | 9/1969 | Beltz et al. | 235/61.11 |
| 3,474,230 | 10/1969 | McMillen | 235/61.7 |
| 3,543,007 | 11/1970 | Brinker et al. | 235/61.11 |

*Primary Examiner*—Stuart N. Hecker
*Attorney, Agent, or Firm*—Ronald T. Reiling

[57] ABSTRACT

Card reader data logic for reading information from a coded card in either a first or second position is disclosed. Once one position of the card as presented has been determined, the data logic interprets each pattern provided on each column of the coded card and generates a compressed code denoting the information presented. The data logic associated with the other position generates a checking code which is combined with the compressed code to detect whether an illegal punched character is present.

13 Claims, 4 Drawing Figures

CARD READER DATA LOGIC WITH POSITION INDICATION AND ERROR DETECTION

BACKGROUND OF THE INVENTION

A. Field of the Invention

The instant invention relates to means for reading coded cards of the type used to provide information such as programs to electronic data processing machines and more particularly relates to means for reading punched cards which may be in either a face up or face down position.

B. Description of the Prior Art

Information to be processed in high speed data processing systems in use today must be originally obtained from some source outside of the system itself. This external source of information may be information-bearing mediums such as magnetic tapes, document-bearing magnetic ink imprints and punch cards.

The use of punched cards as a source of information is traditionally well accepted and indeed offers worthwhile characteristics such as possibility of visual verification of data by an operator, removal of unwanted information, etc. The most common punch cards used today store data in the form of holes punched at the intersections of a matrix having 80 vertical columns and 12 horizontal rows. The rows are customarily numbered reading from top to bottom of the cards as follows: 12, 11, 0, 1 through 9. To specify a character, one or several rows are punched for each column. The combination of row punches is related to a code which specifies one character. The vertical columns are customarily consecutively numbered 1 through 80 beginning at the edge of the card. Information is transferred to a processor by reading the row punches made in each successive column having information stored therein.

While the information stored on punch cards may be represented in any arbitrary code with any arbitrary combination of holes punched in a given column representing any desired symbol such as a numerical or alphabetic character or other symbol, at most 256 characters have been utilized. Although $2^{12}$ or 4,096 combinations of the signals are possible from the punch card, the 256 character codes provide all possible combinations of legal characters. (See American National Standard Hollerith Punched Card Code, ANSI X3.26—1970, approved Jan. 19, 1970 for an example). As a result, the prior art provides a number of coding systems for compressing the 4,096 combinations to the number of characters presented in addition to providing error circuitry which determines an illegal character.

In the past, it has been required that the card be inserted into the card reader in a single predetermined relationship and not otherwise. In order to facilitate this, each card has a diagonal edge which enables the user to properly insert the card into a card reader. While this has tended to be inconvenient, problems have also arisen when the user places the card in an incorrect position. In this situation, the information on the punch card becomes totally inaccurate. In order to overcome this condition, one possible solution is to provide separate logic circuitry to interpret the incorrectly placed card. This results in a duplication of logic circuitry with a consequent greater cost for the system. Another possible solution is to automatically notify an operator that a card has been inserted improperly in the card reader. However, this requires an operator to be constantly present in addition to providing a long time delay before the information is introduced into the system.

Some card readers provide the cards in either a face up or face down position. For the former situation, an operator enters information into the receiving system via a keyboard. For the latter situation, batch reading of cards occurs in a face-down position.

Since it is desirable to be able to immediately detect when the cards are either in a face up or face down position and correctly process the information on the coded card, a new and improved card reader has been provided which has the capability of reading randomly intermixed face up and face down coded cards.

OBJECTS OF THE INVENTION

Accordingly, the primary object of the invention is to provide an improved card reading system which is capable of reading information on a coded card inserted thereinto.

A further object of this invention is to provide card reader data logic which generates a compressed code in response to the code contained on a card.

Another object of this invention is to provide shared card reader data logic thus being low in cost and highly reliable.

Another object of this invention is to provide a new improved coding scheme for reading a card in either a face up or face down position.

A yet further object of this invention is to provide an error detection scheme which detects an illegal punch character on a coded card which may be in either the face up or face down position.

SUMMARY OF THE INVENTION

The foregoing objects are achieved according to one embodiment of the invention and according to one mode of operation thereof, by having in a card reading system, card data logic which provides the functions of sensing information code on a card whether in a face up or face down position, providing an identical compressed code from the sensed code regardless of the face up or face down card position, and generating an error condition if an illegal punch character has been sensed. The card reader data logic includes a flip-flop for detecting whether the card is in a face up or face down position. This flip-flop enables a first logic circuit associated with the corresponding card position to interpret the coded information on the card and transfer a compressed binary code to a register. A second logic circuit associated with the other position generates a checking code. A third circuit, responsive to the compressed binary code and the checking code, generates an error signal indicative that incorrect information has been punched on the card.

BRIEF DESCRIPTION OF THE DRAWINGS

The novel features which are characteristic of this invention are set forth with particularity in the appended claims. The invention itself, however, both as to its organization and operation together with further objects and advantages thereof may be best understood by reference to the following description taken in connection with the accompanying drawings in which:

DETAILED DESCRIPTION OF THE PREFERRED EMBODIMENT

Figure 1:
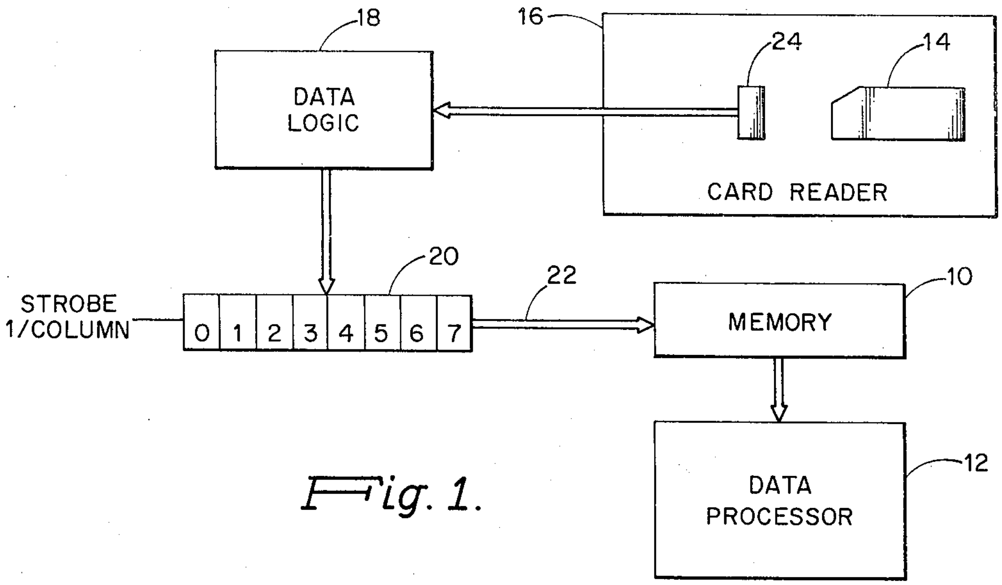
FIG. 1 is a block diagram of an information processing system embodying the nvention.

Referring more particularly to the drawings, FIG. 1 discloses an information processing system wherein a memory 10 associated with a data processor 12 receives information from a plurality of punch cards 14 which are read by a card reader 16. The data processor 12 may be a stored program, general purpose digital computer which processes both alphanumeric and binary information. The programs to be executed and the data to be immediately operated upon are stored in memory 10 formed of, for example, a plurality of magnetic oxide elements (MOS) wherein each element depending upon the voltage level, represents a binary digit (bit) of an instruction or a data word.

The card reader 16 is an on-line input device used to read card information into the memory 10 associated with the data processor 12 but shown independently for descriptive purposes. Interpretation of the data on the cards 14 is determined by data logic 18 which renders the system capable of reading cards in either the face up or face down position. The information is then transmitted from data logic 18 into a shift register which may include a plurality of flip-flops 20 to memory 10 via an input bus 22.

Card reader 16 may be any one of several generally known serial card readers. Since the card reader is a mechanical device, synchronizing signals may be conveniently derived from it. Accordingly, synchronization of the transfer of the data in card reader 16 to data processor 12 may be accomplished by means of photoelectric timing devices mechanically synchronized with the movement of the card over a reading station 24. Reference is made to U.S. Pat. No. 2,832,063 issued to McMillan et al., for a complete disclosure of one known card reader and particularly of a photoelectric timing device which may be used in the transfer of data from card reader 16 to data processor 12.

A reading station 24 of card reader 16 comprises 12 photocells and 12 lamps which are shown in block form as H12 to H9 in FIG. 2. As the card is inserted into the read control station, the holes of the punched card pass the photodetectors. Each of the detectors comprises a phototransistor and a light source in alignment with the phototransistor. The light sources are mounted above the phototransistors which are embedded in a block and masked by a plate having only a narrow slot above each phototransistor. The light source slots, the light source masks and the centers of the phototransistors may be vertically aligned. When each phototransistor receives light from its respective source, it produces a binary output signal. Thus, as the card comes inbetween the detector and the light sources, the detector outputs are binary ZEROS if there is not a hole in the card in which case no light is transmitted and the deflector outputs which perceive light through the holes are binary ONES. The photodetectors have their respective outputs designated as H12, H11, H0, H1 through H9 which outputs are connected to logic to be explained in FIG. 3.

Due to the symmetrical nature of the punch cards, each photodetector will be centered on the correct hole punch whether the card is in a face up or face down position. Thus, the photocells of read station 24 detect each punched hole regardless of the position of the card and provide one input character to data logic 18.

Figure 2A:
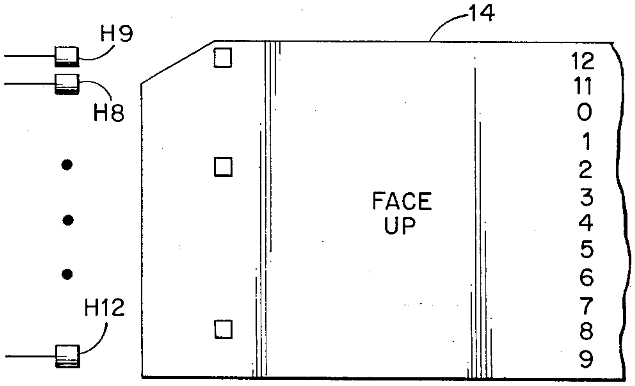
FIGS. 2*a* and 2*b* are partial views of a standard 80 column, 12 row punch card in a face down position and a face up position, respectively, in addition to detection circuitry for the punched card; and, FIG. 3 is a schematic diagram of the card data logic shown in block form in FIG. 1.
Figure 2B:
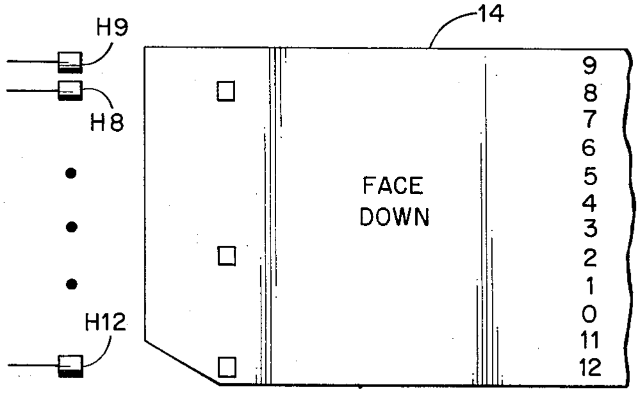

FIGS. 2*a* and 2*b* illustrate partial views of standard 80 column, 12 row cards having the information punched in binary code on the card. Other forms of providing data may be used as is well known to those skilled in the art. For example, data may be represented by magnetic marks or dark lines. Moreover, other sensing means known to those skilled in the art may be used. Thus mechanical or electromagnetic sensing devices may also be utilized. For purposes of this invention, punched holes and photoelectric cells are used to exemplify only one form of implementation.

In FIG. 2, punched data is represented by the black rectangular impressions at the intersection of the various rows and columns. The input signals are related to the rows as follows:

TABLE 1

| FACE DOWN ROW | SIGNAL | FACE UP ROW |
|---|---|---|
| 12 | H12 | 9 |
| 11 | H11 | 8 |
| 0 | H0 | 7 |
| 1 | H1 | 6 |
| 2 | H2 | 5 |
| 3 | H3 | 4 |
| 4 | H4 | 3 |
| 5 | H5 | 2 |
| 6 | H6 | 1 |
| 7 | H7 | 0 |
| 8 | H8 | 11 |
| 9 | H9 | 12 |

In the table shown for the face up and face down rows, 12, 11, 0, 8 and 9 represent zone punches and 1 to 7 represent digit punches. For a legal character to be presented any or all zone punches may be made, but at most only one digit punch can be made. An illegal character is thus a punched column which has two or more digit punches.

In the 12 row binary mode of representation as illustrated in FIG. 2, all 12 punching positions of the card are used. A punched impression represents a binary ONE and no punched impression represents a binary ZERO. Since each column of the card shown in FIG. 2 contains a single character, each card can hold 80 characters. As alphanumeric data is read, each character is converted into a code for reading into memory. According to the American National Standards Card Code Representations, Document ANSI X3.26—1970, a standard for 256 characters including the 128 characters of ASCII and 128 additional characters in 12 row punch cards has been specified. Since this represents the maximum number of characters in a system, the preferred embodiment is directed to its implementation. However, if a lesser class of characters are used in the system, for example, 56, 128 or 200, then a conversion system or a change in code would be able to be provided. For example, a portion of main memory 10 containing 256 locations, each location associated with one of the legal characters may be utilized. In response to the characters generated, memory 10 would then provide only those characters within the lesser class. Alternately, the card data logic shown in FIG. 3 may be modified such that it provides a binary code only for the lesser class of characters being utilized in the current system.

As the card 14 is advanced to the reading station 24, a suitable leading edge detection of the photoelectric timing device as shown in the above-cited reference may be utilized for synchronizing the reading and transfer of data from the card 14 to the data processor 12. More specifically, referring to FIG. 3, logic 28 determines the mode of reading, i.e., whether a face up or a face down portion for the card is punched. Logic 28 includes leading edge detector circuit 30 which is responsive to the leading edge of card 14. Leading edge detector 30 may be any one of those well known in the art. In addition to initiating a delay until the middle of the hole in the first column of the card being read (or the place where it would be if one is not punched in this column) leading edge detector circuit 30 provides one input to AND gates 34 and 36. A second input to these gates is provided by photoelectric detectors H12 and H9 shown in FIG. 2. These detectors are responsive to the diagonal edge of card 14 as shown in FIG. 2. If the card is in a face down position, photocell H12 associated with row 12 on the card provides a binary ONE signal since it will be receiving a light from the light source (not shown). This binary signal enables AND gate 36 which sets flip-flop 32 such that a face down signal is provided by flip-flop 32 over line 40. Alternatively, if the card is in a face up position, photocell H9 associated with the row 12 is enabled. AND gate 34 coupled to photocell H9 is enabled and resets flip-flop 32 such that a face up signal is provided by flip-flop 32 over line 38. Thus, with the coincidence of the leading edge of the card or a short time thereafter, a timing signal and an output signal associated with row 12 or row 9 will be provided to AND gates 34 and 36. The signal from AND gates 34 or 36 will enable flip-flop 32 to designate whether the card is in a face down or face up position.

Other means may be used to set or reset flip-flop 32. Thus, a mechanical switch or the card reader may be connected to flip-flop 32 and when enabled applies a resetting signal to flip-flop 32. Alternatively, if a batch condition is present, a card or the first column in the card with a predefined punched set may be used to set flip-flop 32. Other variations could include data processor 12 setting flip-flop 32.

A preferred form of the invention has flip-flop 32 set until a card in the face up position is presented. Then flip-flop 32 is reset for that card. Alternatively, flip-flop 32 can be in the reset mode and when a card in the face down position is presented, flip-flop 32 will be set for that card.

Lines 38 and 40 of the flip-flop 32 are connected to logic 42. When the card is inserted in the face down position as shown in FIG. 2, flip-flop 32 is set and its output enables AND gates 44*a* to 44*h* such that they are ready to produce an output. Conversely, when the card is inserted in the face up position as shown in FIG. 2, flip-flop 32 is reset so that AND gates 46*a* to 46*h* are ready to produce an output.

A second signal is provided to AND element 44*a* to 44*h*, 46*a* to 46*h* by detectors H12, H11, H0, H1 to H9 of card reader 16 which detects the holes in the punched cards regardless of the manner in which the punched card is inserted. However, the information represented by the punched card is dependent upon the position of the card. Thus, for example, if the uppermost rows are punched, detectors H12 apply a signal H12 to AND gate 44*a* and a signal H9 to AND gate 46*d*. As previously mentioned, flip-flop 32 provides an output at its one section when the card is in a face down position, and an ouput at its zero section when the card is inserted in a face up position. Consequently, when the card is inserted in the face up position as shown in FIG. 2*a*, and a hole is detected by H12, AND element 44*a* is enabled to provide an output signal. If the card were inserted in the face down position, AND element 46*a* would be enabled to provide an output signal.

AND gates 44*a* to 44*h* and 46*a* to 46*h* have their outputs coupled to OR gates 48*a* to 48*h*. Depending upon the position of the card, only one of the AND gates 44*a* to 44*h* and 46*a* to 46*h* may be enabled. The output of OR gates 48*a* to 48*h* provides a consistent representation for the card punched. Thus, OR gate 48 indicates whether or not a hole is sensed for the position corresponding to the uppermost row of the card if a face down position or the lowermost row of the card if the card is in a face up position. OR gates 48*a* to 48*e* represent a simple selection of input signals according to the face up or face down position of the coded card. OR gates 48*a* to 48*h* provide for a compressed binary code such that only eight binary signals represent the 12 signals on the coded card.

Also, connected to the output of flip-flop 32 are AND gates 44*a* and 46*i*. These AND gates, when enabled, detect a digit punch. Thus, for a card in a face up position H0 represents a digit punch and for the card in a face down position, H7 represents a digit punch. AND gates 44*i* and 46*i* ensure that only the digit punches are presented as an output to digit punch logic.

The output of AND gates 46*i* is coupled to OR gates 50*a*, 50*b*, and 50*c*, and the output of AND gate 44*i* is coupled to OR gates 52*a*, 52*b* and 52*c*. Each of these OR gates 50 and 52 is also connected to a plurality of photodetectors and more specifically to predetermined H1 to H6 detectors which are common digit punches to each group. The output of OR gates 50*a* and 50*c* provide a compressed code for the digit punches. Since there are seven digit punches, a three bit code represents all legal combinations thereof, i.e., either one of the seven digit punches or none of them. Each OR gate 50*a* to 50*c* and 52*a* to 52*c* is responsive to a digit punch that provides the correct bit code. Thus, OR gate 50*a*, 52*a* have as their inputs each of those digit punches which would provide the highest bit in the three bit code. These would be digit punches H0, H1, H2, H3 and H4, H5, H6, H7 for the face up and face down positions, respectively.

The output of OR gates 50*a* to 50*c*, 52*a* to 52*c* are provided to the AND gate 46*f* to 46*h* and 44*f* to 44*h* respectively, each of which has a second input coupled to flip-flop 32. If the down position occurs, then AND gate 44*i* is enabled to provide digit punches to OR gates 52*a* to 52*c* and AND gates 44*a* to 44*h* are also enabled to provide the correct octal code. Similarly, for the face up logic, AND gate 46*i* is enabled to provide digit punches to OR gates 50*a* to 50*c* and AND gates 46*f* to 46*h* are also enabled to provide the correct octal code for the card position. The output code D1 through D8 is related to the input code as follows:

TABLE 2

| CODE | FACE DOWN | FACE UP |
|---|---|---|
| D8 | H12 | H9 |
| D7 | H11 | H8 |
| D6 | H0 | H7 |
| D5 | H9 | H12 |
| D4 | H8 | H11 |
| D3 | H4+H5+H6+H7 | H3+H2+H1+H0 |
| D2 | H2+H3+H6+H7 | H5+H4+H1+H0 |
| D1 | H1+H3+H5+H7 | H6+H4+H2+H0 |

Note: D3, D2 and D1 are not numerically correct in the case of two or more "digit punches."

OR gates 50*a* to 50*c* and 52*a* to 52*c* have a second output to AND gates 54*a* to 54*c*, respectively. AND gates 54*a* to 54*c* comprise the error logic 58 which detect more than one digit punch. If this situation occurs, one of the AND gates 54*a* to 54*c* is enabled providing a signal to OR gate 56, resulting in OR gate 56 providing an output error indication. More specifically, since OR gates 50, 52 are enabled for each digit punch whether or not the face down or face up position is presented, gates 50*a* to 50*c* and 52*a* to 52*c* not only provide signals corresponding to the digit punches but also provide a checking code for an error condition. This results since the logic associated with the incorrect position generates one set of signals which when combined with the signals generated from the correct position provide a condition wherein every combination of possible errors is presented. Stated differently, the signals provided by OR gates 50*a* to 50*c* and 52*a* to 52*c*, in combination, detect all possible combinations of two or more signals of the set H0 to H6 or H1 to H7 depending on the card position. This can be represented logically as follows, assuming that the face down position has been selected.

$52c = H1 + H3 + H5 + H7$ $50c = H2 + H4 + H6$ $(52c) \cdot (50c) = 1.2 + 1.4 + 1.6 + 2.3 + 3.4 + 3.6 + 2.5 + 4.5 + 5.6 + 1.7 + 4.7 + 6.7$ $52b = H2 + H3 + H6 + H7$ $50b = H1 + H4 + H5$ $(52b) \cdot (50b) = 1.2 + 1.3 + 1.6 + 1.7 + 4.2 + 4.3 + 4.6 + 4.7 + 5.2 + 5.3 + 5.6 + 5.7$ $52a = H4 + H5 + H6 + H7$ $50a = H1 + H2 + H3$ $(52a) \cdot (50a) = 1.4 + 1.5 + 1.6 + 1.7 + 2.4 + 2.5 + 2.6 + 2.7 + 3.4 + 3.5 + 3.6 + 3.7$ The logical combinations as expressed on the opposite side of the equal sign have the H omitted since it is not considered necessary for the logical expression. Moreover, the logical signal presented by each set of the three OR gates above contain at least one term to detect any pair of digit punches. If the face up position were the actual position of card 14, then H0 would be provided and H7 omitted and the same generic formula would be presented. Since either H0 or H7 depending on the card position is not a digit punch, AND gates 44*i* and 46*i* inhibit their generation such that no spurious illegal condition is sensed. Thus, depending on the position of the card, one of the OR gates 50, 52 provides a compressed octal code for the digit punch while the other OR gate provides a checking code to determine whether two or more digit punches were made.

Figure 3:
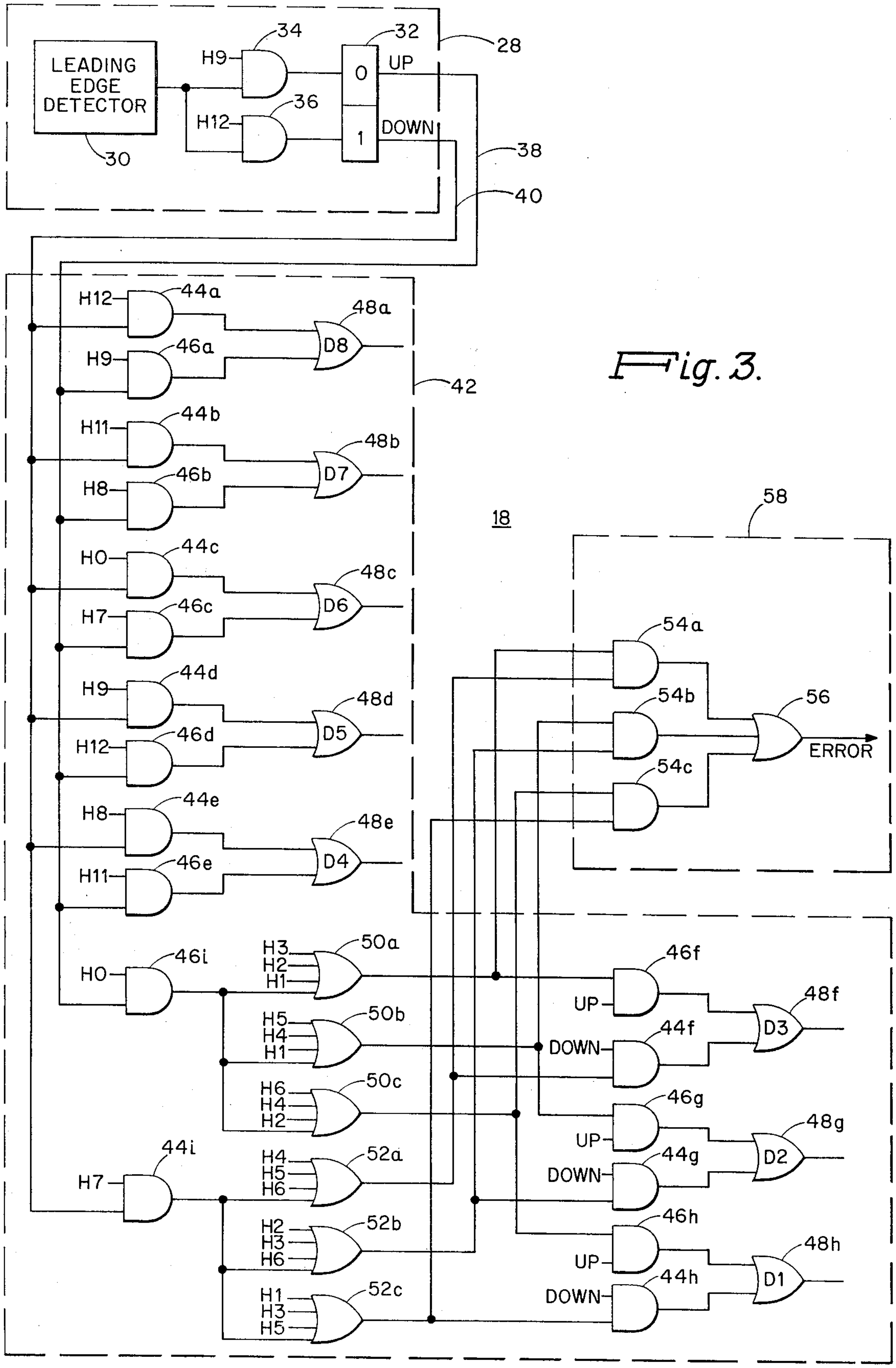

In order to illustrate how the logic of FIG. 3 operates, one example will be given. For this example, a parenthesis "(" has been selected to be the first character represented by card 14. A "(" is represented on a coded card by the row punches 12, 8, 2. The example will be taken in both the face down and face up mode to illustrate that the same eight bit binary code is generated.

As the card is passed along card reader 16, photodetectors in reading station 24 detect the front end of the coded card enabling leading edge detector 30. Concurrently or a short time thereafter, photodetector H12 transmits a binary ONE signal when the coded card is in a face down position since it is receiving light from a digit source. This enables AND gate 36 which sets flip-flop 32 enabling the face down line 40. As the column with the parenthesis is sensed, photocells H12, H8 and H2 provide binary ONE signals. As a result, AND gate 44*a*is enabled since it has a binary ONE from photodetector H12 and a binary ONE from the line 40 at its inputs. In response to these inputs, AND gate 44*a* provides an output to OR gate 48*a* resulting in a binary ONE signal being provided by OR gate 48*a*. AND gate 44*e* will similarly be enabled since photodetector H8 senses a row punch. As a result, OR gate 48*e* presents a binary ONE signal at its output. OR gate 52*b*will have a binary ONE signal at its input and provide a binary ONE as one input to AND gate 44*g*. Since the flip-flop 32 provides a signal over line 40, the other input to AND gate 44*g* has a binary ONE. As a result, AND gate 44*g* provides an output to OR gate 48*g* resulting in a binary ONE signal at its output. All the other OR gates 48 have binary ZEROS at their outputs since none of the AND gates to which they are coupled will be providing binary ONE signals. Thus, the binary code 10001010 from OR gates 48*a* to 48*h* is presented to shift register 20. As stated previously, this compressed binary code is then strobed from shift register 20 into memory 10 via input bus 22. The code representing one character will subsequently be presented to the data processor 12.

For the same punches in the face up position, the operation when viewing Table 1 would be as follows. AND gate 34 is enabled since photocell H9 will have a binary ONE input in addition to the signal from leading edge detector circuit 30. As a result, AND gate 34 enables flip-flop 32 to be in the reset position providing output signal over line 38 indicating the face up mode. AND gate 46*a* will have a binary ONE signal at its H9 input and also a binary ONE signal from line 38 thereby providing a binary ONE signal to OR gate 48*a*. AND gate 46*e* will have a binary ONE signal at its H11 input and also a binary ONE signal from line 38 thereby providing a binary ONE signal to OR gate 48*e* which in turn provides a binary ONE signal at its output. OR gate 50*b* has a binary ONE signal at its input and presents a binary ONE signal to AND gate 46*g*. Since AND gate 46*g* has a binary ONE signal at its other input, it provides a binary ONE output to OR gate 48*g*. As a result, the binary code representing this signal in the face up position will be 10001010 which is the same code for the face down position of the punch card.

If an illegal code were generated, for example, if punches 12, 0, 2 and 6 as viewing the face down position were presented, an error signal would be generated. This would occur as follows. AND gates 44*a* and 44*c* would be enabled providing binary ONE signals to OR gates 48*a* and 48*c* respectively. OR gates 50*a*, 50*c*, 52*a* and 52*b* would be enabled since each of these is responsive to photodetectors H2 and H6. And gate 44*f* would be enabled since OR gate 52*a* and the down signal would be providing binary ONE signals to its input. As a result, OR gate 48*f* would provide a binary ONE signal at its output. OR gate 44*g* would also be enabled since OR gate 52*b* would be providing a binary ONE signal and the line 40 from flip-flop 32 would be providing a binary ONE signal. As a result, OR gate 48*g* would be presenting a binary ONE signal. Since both OR gates 50*a* and 52*a* would have binary ONE signals at their output, AND gate 54*a* would be enabled and would provide a binary ONE output to OR gate 56 thus indicating that an error in the coded card was presented. The signal provided by OR gate 56 can be utilized in any way known in the prior art. For example, the signal provided to shift register 20 may be inhibited such that incorrect information would not be provided to memory 10. This could be accomplished by tying the output of OR gate 56 to the synchronizing signal via an AND gate.

If the card were in a face up position, the same error results would be achieved. Thus, photodetectors H12, H0, H2 and H6 would be enabled providing signals H9, H7, H5, H1 to OR gates 50, 52. As a result OR gates 50*a*, 50*b*, 52*b* and 52*c* would provide binary ONE signal outputs. AND gate 54*b* is coupled to OR gates 50*b* and 52*b* and would be enabled thus providing a binary ONE output to OR gate 56 resulting in an error signal.

While the principles of the invention have now been made clear in an illustrative embodiment, there will be immediately obvious to those skilled in the art, many modifications in structure, arrangement and components used in the practice of the invention without departing from those principles. Thus, the AND and OR gates can be replaced by suitable equivalents such as NAND, NOR, exclusive OR and inclusive OR gates. Other means may be used to sense whether the card is in a face down or face up position. Moreover, the use of photoelectric devices may be replaced by pressure sensing devices or by suitable other means well known in the art. In addition, the providing of the data in the cards and the accompanying sensing device may be any well known in the art.

If the card has a diagonal edge on the right hand corner, then trailing edge detector circuitry may be utilized to sense the position of the card. U.S. Pat. No. 3,342,410 issued to Masterson et al., and assigned to the same assignee as this invention shows one embodiment using trailing edge circuitry which may be suitably implemented to provide this feature. If rectangular cards having no diagonal edges are used in the system, a first card having a diagonal edge or a code on the first rectangular card or first column of the rectangular card would be required. The preferred form of setting or resetting flip-flop 32 would then be utilized. The appended claims are, therefore, intended to cover and embrace any such modifications, within the limits only of the true spirit and scope of the invention.

What is claimed is:

1. A card reader system in combination with a plurality of cards having information indicia thereon and adapted to be inserted into said system, said system comprising:

means for indicating whether each of said plurality of cards is in a first or a second position, means for detecting said information indicia to produce a plurality of first signals corresponding to said information indicia, means responsive to said indicating means and to said detecting means for generating a plurality of second signals, said plurality of second signals being less in number than said plurality of first signals, and means responsive to said detecting means and said indicating means for producing an error signal indicating that said detecting means has detected incorrect information.

2. A system as defined in claim 1 wherein said means for indicating provides a third signal when said card is in said first position and a fourth signal when said card is in said second position.

3. A system as defined in claim 2 wherein said generating means is responsive to both said third and said fourth signals of said indicating means and wherein said generating means includes first means responsive to said third signals and second means responsive to said fourth signals and wherein said second plurality of signals is identical whether generated by said first or said second responsive means.

4. A system as defined in claim 3 wherein said first position is a face up position and said second position is a face down position.

5. Card reader data logic for reading information from a stack of punch cards having coded information stated thereon in spaced columns after a leading edge to a data processor, said cards provided in either a first or second position, said logic comprising:

a first plurality of gates for controlling the transfer of coded information read from said cards in said first position, a second plurality of gates for controlling the transfer of coded information read from said cards in said second position, means for transmitting a signal upon sensing said leading edge of said card, and means responsive to said transmitting means for disabling either said first of said second plurality of gates, said disabling means allowing a transfer of information from said card through the undisabled plurality of gates, whereby said information from said punched cards is provided to said data processor.

6. Data logic as defined in claim 5 and further including:

first means responsive to one of said plurality of first gates for providing a compressed code when said cards are in said first position and for providing a checking code when said cards are in said second position, second means responsive to one of said second plurality of gates for providing a compressed code when said cards are in said second position and for providing a checking code when said cards are in said first position, and wherein a predetermined number of said first and said second plurality of gates are coupled to said first and second providing means for providing a compressed binary code.

7. Data logic as defined in claim 6 and further including:

error detecting means responsive to said first providing means, said second providing means and said transmitting means for providing an error signal indicative of incorrect coded information in said column on said card.

8. A card reader system for reading information from a stack of punched cards having coded information stored therein in spaced columns, said system comprising:

means for detecting said coded information, means responsive to said detecting means for providing first signals corresponding to said coded information, means for indicating a first or a second position of each of said cards, a first plurality of gates each responsive to one of said first signals of said detecting means and said indicating means, for translating said first signals to second signals, a second plurality of gates responsive to a plurality of said first signals from said detecting means and said indicating means for compressing said plurality of first signals to a plurality of third signals, said plurality of signals being less in number than said plurality of first signals, a third plurality of gates responsive to one of said third signals and said indicating means for translating said third signals to fourth signals, and a fourth plurality of gates responsive to a pair of said third signals for providing a fifth signal indicative of an error condition.

9. The system as defined in claim 8 wherein said indicating means provides a face up signal when said card is in said first position and a face down signal when said card is in a said second position.

10. The system as defined in claim 9 wherein said second plurality of gates comprises a first set of gates responsive to a face up signal of said indicating means and a second set of gates responsive to a face down signal of said indicating means and wherein each of said fourth plurality of gates is responsive to one of said third signals from said first set of said second gates and one of said third signals from said second set of said second gates.

11. The system as defined in claim 10 wherein said one of said first set of second gates and said said one of said second set of second gates are mutually complementary.

12. The system as defined in claim 11 and further including:

a fifth plurality of gates coupled to said first and third plurality of gates for providing a plurality of sixth signals representing said coded information, and means responsive to said fifth plurality of gates for storing said sixth signals.

13. The system as defined in claim 12 and further including:

a data processor, and means for strobing said storing means, said strobing means providing said sixth signals to said data processor, said sixth signals indicating a character provided in a corresponding column of said punched card of said coded information.

* * * * *